United States Patent [19]

Willinger

[11] Patent Number: 4,895,646
[45] Date of Patent: Jan. 23, 1990

[54] EXTERNAL AQUARIUM FILTER

[75] Inventor: Allan H. Willinger, Oakland, N.J.

[73] Assignee: Willinger Brothers, Inc., Oakland, N.J.

[21] Appl. No.: 209,412

[22] Filed: Jun. 20, 1988

[51] Int. Cl.[4] .............................................. A01K 63/04
[52] U.S. Cl. ................................ 210/169; 210/416.2; 210/439; 210/445; 119/5
[58] Field of Search ............ 210/169, 416.2, DIG. 17, 210/232, 438, 439, 440, 445; 119/3.5

[56] References Cited

U.S. PATENT DOCUMENTS

| | | | |
|---|---|---|---|
| 375,798 | 1/1888 | Buchhorn | 210/439 |
| 1,229,608 | 12/1916 | Hale | 210/439 |
| 1,539,910 | 6/1925 | Parish | 210/439 |
| 2,729,337 | 1/1956 | Alferman | 210/416.2 |
| 2,828,019 | 3/1958 | Lambertson | 210/169 |
| 3,371,789 | 3/1968 | Hense | 210/169 |
| 3,418,973 | 12/1968 | Saito | 210/169 |
| 3,771,544 | 11/1973 | Horvath | 210/169 |
| 4,024,064 | 5/1977 | Rakowicz et al. | 210/169 |
| 4,265,751 | 5/1981 | Willinger | 210/416.2 |
| 4,285,813 | 8/1981 | Stewart et al. | 210/416.2 |
| 4,297,212 | 10/1981 | Padgett | 210/439 |
| 4,490,250 | 12/1984 | Dockery | 210/169 |
| 4,491,520 | 1/1985 | Jaye | 210/232 |
| 4,512,724 | 4/1985 | Horvath | 210/169 |

FOREIGN PATENT DOCUMENTS 0235615 11/1985 Japan .................................. 210/167

Primary Examiner—W. Gary Jones
Assistant Examiner—Coreen Y. Lee
Attorney, Agent, or Firm—Helfgott & Karas

[57] ABSTRACT

An external aquarium filter of the canister type formed of a flat, substantially cylindrical container with a screw-top cover. Both inlet and outlet ports extend through the cover. The inlet port continues with a depending tube to be in flow communication with the bottom of the container and the outlet port is in flow communication with the top of the container. A sheet of foam filtering material is supported in the middle of the container to define a contaminated water chamber beneath the filtering material and a clean water chamber above the filtering material. An air pump or water pump can be used to provide the continuous flow of water through the filter. The water pump can be integrally formed on the cover and include an encapsulated stator, whose housing is integrally molded with the cover. A magnetically coupled impeller is positioned within the outlet flow path to aid in the flow of water through the filter.

9 Claims, 5 Drawing Sheets 4,895,646

EXTERNAL AQUARIUM FILTER

BACKGROUND OF THE INVENTION

This invention relates to an external aquarium filter, and, more particularly, to a canister filter, which is positioned externally of an aquarium tank.

Numerous types of filtering apparatus are available for aquarium filtration. Generally, it is desired that the apparatus should perform all three of the basic types of filtration. Specifically, the filter should perform, mechanical filtration, which removes the suspended solid material from the water. It should also achieve chemical filtration, which removes dyes and other colorants, as well as certain inorganic substances. The third, and probably most important filtration to be achieved is that of biologic filtration, which removes certain organic waste products by means of naturally occurring bacteria living attached to the filter material.

One type of aquarium filter is the external aquarium filter which typically has a housing that hangs suspended from a wall of the aquarium tank. The contaminated water is extracted from the aquarium tank and supplied to the filter. Through the use of various filtering materials in the filter housing, the water is filtered and passes to a clean water chamber. From there, the water flows back into the aquarium tank, providing clear water to the aquarium, as well as providing the necessary aeration needed into the tank.

The type of filtering material typically utilized in external aquarium filters generally includes a layer of charcoal with an additional layer of glass wool or polyester fibers placed above the charcoal.

Another type of external aquarium filter is typically referred to as the canister filter. Such filters are generally placed adjacent to or beneath the aquarium tank and are typically in the form of a tall cylindrical can. Through a siphon arrangement, the water is drawn out of the aquarium tank and passes through a port in the bottom of the canister filter. The water then flows upwardly through a filtering material to the top of the canister. From there, the water flows out of the top of the canister and back into the aquarium tank. While a siphon arrangement can be used to extract the contaminated aquarium water, additional pumping is required to maintain a continuous flow and return the water back to the aquarium tank.

The typical canister filter utilizes the same type of filter material as other external filters, including layers of charcoal, glass wool, or polyester fibers. Additionally, ceramic tubes of short length are typically placed in the canister filter in order to provide additional surface area for the growth of aerobic bacteria within the canister filter in order to enhance biological filtration.

An improved external aquarium filter has been provided in U.S. Pat. No. 4,265,751, assigned to the assignee of the present invention. In that patent, there is provided a canister type filter which is flat, elongated, and can receive a layer of open cell, reticulated, foam plastic material, such as polyurethane foam as the filtering material. Because of the very large surface area provided by the foam material, and because of the thin, flat nature of the filter, there is a very large surface area provided for filtering, thereby increasing the area for the growth of the necessary bacteria required for biological filtration of the toxic waste in the contaminated water.

In the canister type filter of the aforementioned patent, the clear water chamber is at the top of the canister, and the contaminated water chamber is beneath the filter material. As a result, the filtering is from the bottom upwards, through the foam material. Therefore, the bottom contaminated water chamber also acts as a settling chamber where the larger particles of detritus and food can settle. As a result, the dirt particles will not clog the pores of the foam and will not impair the functioning of the filter bed. On the other hand, the solid particles will fall against the bottom of the filter housing, leaving the face of the filter bed free for the flowing water. Since large particles of debris do not clog the filter bed, a very fine foam can be used, which would increase the surface area for bacterial attachment and, therefore, increase the carrying capacity of the filter bed immensely. This lack of accumulation of debris along the surface and within the pores of the foam permits a great improvement over the prior art canister type filters.

In the aforementioned filter, the housing is constructed substantially of rectangular configuration, being elongated and flat. Opposing ribs, respectively depending from the top surface and projecting upward from the bottom surface, approach each other with a space therebetween defining a channel in which the layer of foam can be inserted. To insert and remove the foam, one end of the housing is opened to extract the foam when cleaning or replacement is needed and to insert another sheet of foam or reinsert the same foam after it has been cleaned.

Generally, with all types of canister filters, since the filtering is from the bottom upwards through the filter bed, the inlet port is provided at the lower end of the canister housing. The outlet is adjacent the upper end. Any pump that is utilized is externally provided.

While such canister filters have been useful, and especially the aforementioned external filter of U.S. Pat. No. 4,265,751, alternate structures could provide additional manufacturing benefits and also facilitate insertion and removal of the foam filtering material.

SUMMARY OF THE INVENTION

Accordingly, it is an object of the present invention to provide an improved external aquarium filter, which provides efficient operation, easy usage, and can be readily manufactured.

Another object of the present invention is to provide an improved canister filter for use with aquarium tanks.

Still a further object of present invention is to provide an external aquarium filter which provides features of a biological filter.

Yet another object of the present invention is to provide an external aquarium filter of the canister filter type having an integrally provided impeller pump unit. Another object of the present invention is to provide a canister type filter of flat cylindrical construction having the benefits of a biological filter and including a magnetically coupled impeller unit for bringing the clean water back to the aquarium tank.

Briefly, in accordance with the present invention, there is provided an external aquarium filter formed of an open top container and having a removable cover. A pair of fluid flow ports are provided in the cover. A support in the container retains a layer of filtering material transversely across the filter container to define an upper and lower chamber respectively above and below the filtering material. A tube depends from one of the fluid flow ports and into flow communication with the lower chamber. The other fluid flow port is in flow communication with the upper chamber.

The lower chamber is typically the contaminated water chamber and the flow port with the depending tube comprises the inlet to the filter. The upper chamber is the clear water chamber, and the flow port in communication with the upper chamber is the outlet.

The filter container is a flat cylindrical can having a reduced diameter upper neck portion, which is externally threaded to receive a screw on top cover. The filter can be placed beneath the aquarium tank. A siphon tube placed into the aquarium tank provides a siphoned flow of the aquarium water from the aquarium tank into the inlet of the filter. A conduit is coupled from the outlet of the filter container back into the aquarium tank. In order to provide the return flow of the clean water, an external air pump can be provided which supplies compressed air into the return conduit at a certain point below the water level in the aquarium tank. In this manner, the portion of the conduit above that point defines an airlift tube.

Alternately, a water pump can be provided. The water pump can include an impeller type unit wherein a stator assembly can be encapsulated within a housing integrally molded onto the cover. A fixed shaft can be provided within the outlet port. A rotor freely rotating on the shaft is magnetically coupled to the stator and is drivingly connected to an impeller unit positioned within the flow path of the outlet port. The impeller serves to draw the water through the outlet port and provide the necessary pumping for the return flow of the clean water back to the aquarium tank.

By unscrewing the cover, the filtering material can be easily inserted and removed from the filter can. Additionally, a perforated basket can be placed above the filtering material to hold carbon and other filtering material to provide a chemical filtration.

The aforementioned objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENT

Figure 1:
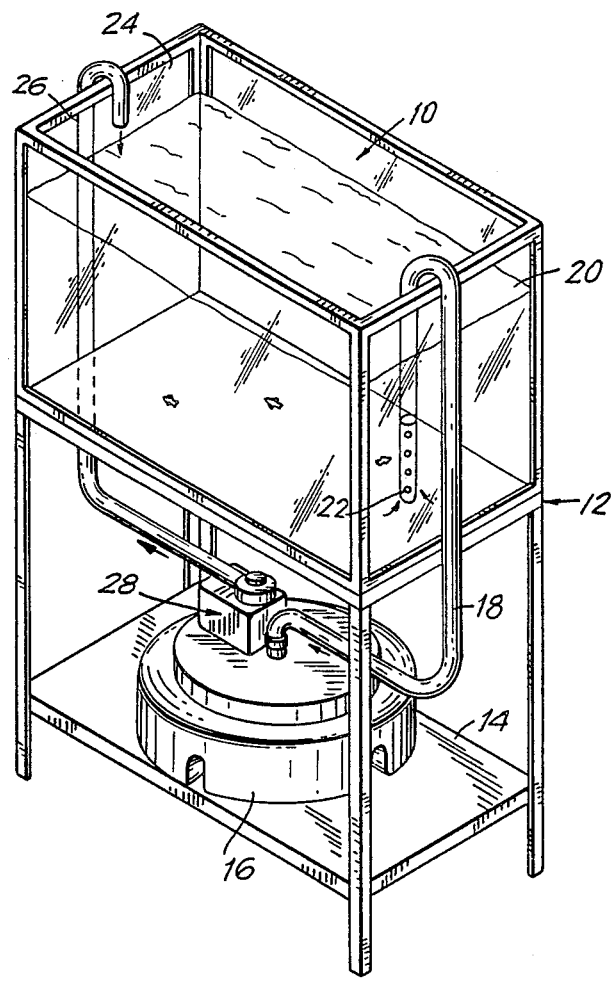
FIG. 1 is a perspective view of an aquarium tank utilizing the improved aquarium filter of the present invention.
Figure 2:
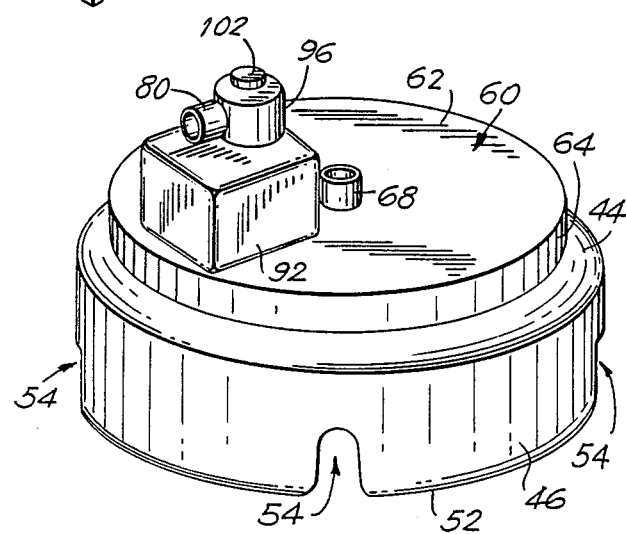
FIG. 2 is a perspective view of the canister filter of the present invention in accordance with one embodiment thereof.

Referring now to the drawings, there is shown an aquarium tank 10, supported on a table 12, having a lower shelf or platform 14. Placed on the lower shelf 14 is the housing 16 of the filter assembly of the present invention. The filter housing 16 is in communication with the aquarium tank by means of an inlet tube 18, which extends over the edge of one end wall 20 of the aquarium tank and terminates at its end in a strainer 22 to prevent the fish from being sucked into the inlet tube 18. Across the opposing end wall of the aquarium tank 24 is provided an outlet conduit 26, which passes upwardly and extends over the edge of the wall 24. As shown by the arrows, the flow of contaminated water is into the strainer 22, through the inlet tube 18 and into the filter housing 16. After being filtered, the clean water passes through the outlet conduit 26 and back into the aquarium tank 10.

In operation, the filter is started by placing the inlet tube 18 into the aquarium water and starting a siphon action in order to cause the aquarium water to flow through the filter. The siphon can be started by creating a vacuum therein, in any known manner. For example, a vacuum pump could be attached to the end of the outlet conduit 26 causing a vacuum within the siphon. Once the siphon is started, the aquarium water contained within the siphon will flow downwardly to the filter housing positioned beneath the aquarium tank. In this way, water from the aquarium tank will continuously flow into the filter.

By means of standard siphoning principles, once the siphon is started, water from the aquarium tank will continuously flow into the siphon tube 18, then through the filter housing 16, and, finally, upward through the outlet conduit 26 until it reaches a height in the conduit 26, which is proximate the water level in the aquarium tank. However, additional pumping action is required in order to bring the water above the edge of the aquarium tank to permit it to be discharged back into the aquarium tank.

One type of pumping action can be provided by means of a water pump or impeller unit 28, which can be integrally provided on the filter housing 16, as will hereinafter be described.

Figure 9:
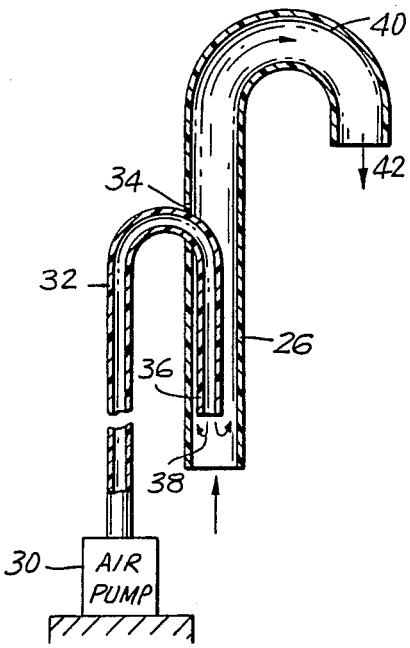
FIG. 9 is a side-sectional view of a portion of the output conduit useful in illustrating the use of an air pump creating an airlift water action to maintain a flow of aquarium water through the filter container.

Another method is by utilizing an air pump. Referring now to FIG. 9, there is shown the presence of an air pump 30 having an outlet air tube 32 which enters into the outlet conduit 26 through an opening 34. The lower distal end 36 of the air tube 32 is positioned at a point below the level of the water in the aquarium tank. Air from the pump 30 passes out of the distal end 36, as shown by the arrows 38. The air then passes up through the conduit 26. The air bubbles upwardly and carries with it the clean water contained in the outlet conduit 26 to thereby airlift the water through the neck portion 40 so that it will exit 42 from the outlet end of the conduit tube 26 and into the aquarium tank, as shown by the arrows 42.

Figure 6:
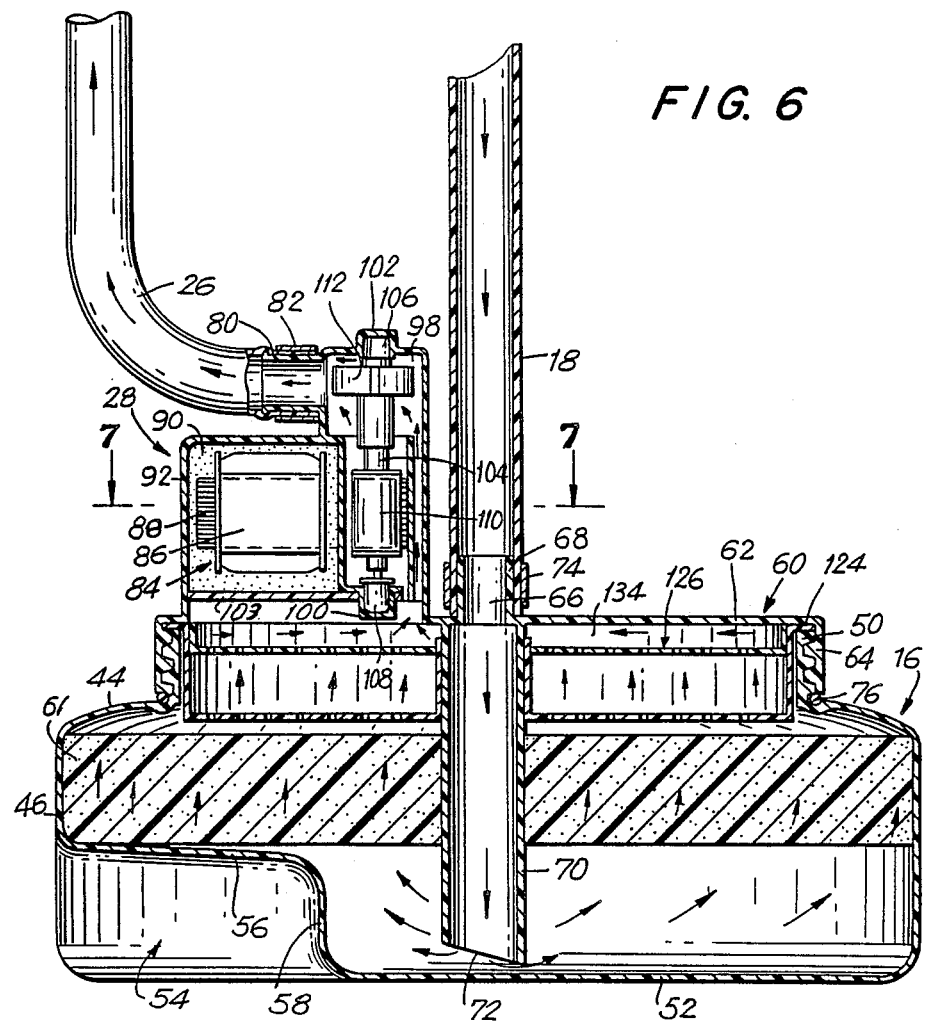
FIG. 6 is a cross-sectional view taken along line 6—6 of FIG. 5 and showing the internal structure of the container and the operation of the pump impeller unit in maintaining a flow of aquarium water through the filter container.

With reference now to FIGS. 2-6, the filter is provided as a substantially flat, circular cylindrical container 44 having an external peripheral wall 46 and an inwardly directed upper shoulder portion 48. The shoulder portion 48 terminates in an upwardly extending, externally threaded, neck portion 50 having a diameter less than the diameter of the peripheral portion 46 of the container. Provided in the lower part of the cylindrical portion, and extending upwardly from the base 52 are a plurality of radially extending knee sections 54. As best shown in FIG. 6, the knee portions 54 include an upper wall radially extending from the outer peripheral edge 46 partially toward the center portion and terminating in a downwardly extending wall 58. The horizontal wall 56 provides a shelf for supporting the filtering layer 61. Four such knee portions 54 are provided in quadrature relationship around the periphery of the container.

A circular cover 60 having a substantially flat top 62 with a downwardly depending peripheral edge wall 64 serves to close the filter. The peripheral edge wall 64 is internally threaded to provide a screw top cover onto the container. A central aperture 66 is provided in the cover, including an upwardly projecting nipple 68 defining an inlet port and continuing into a downwardly extending tube 70, which extends into the container. The lower edge of the tube 70 is angularly cut at 72 to facilitate the flow of inlet aquarium water. As best seen in FIG. 6, the bottom of the tube 70 terminates adjacent to, but slightly spaced from the base wall 52 of the container 16. The inlet tube 18 is connected to the inlet port 68 by means of a hose clamp 74. An O-ring 76 can be placed between the cover and the housing 16 to seal the connection therebetween.

The outlet from the filter housing 16 is provided at an outlet nipple 80 defining an outlet port to which is connected the outlet conduit 26 and retained in place by means of a hose clamp 82.

Figure 7:
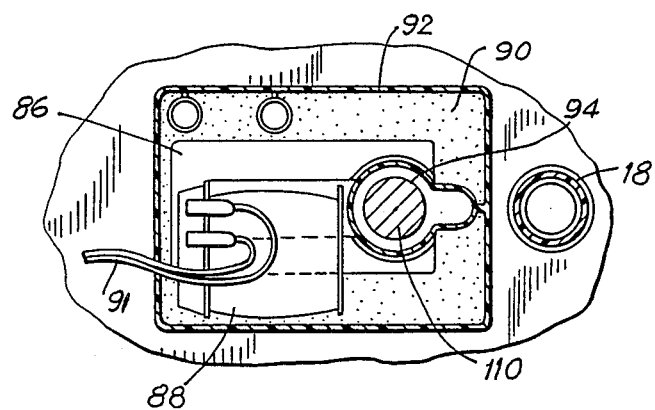
FIG. 7 is a cross-sectional view taken along lines 7—7 of FIG. 6 and showing the internal structure of the magnetically coupled impeller unit.

The pumping is provided through an impeller unit 28 that can best be seen in FIGS. 6 and 7. A stator unit 84 includes a stack of stator laminations 86 in the form of a U-shaped configuration. At least one energizing coil 88 is provided and is shown to be wound around one of the legs of the stator laminations. Wires 91 extend from the unit for connection to a source of energy, such as a wall socket. The stator unit is enclosed with potting material 90 and contained within an external housing 92. The housing can be integrally molded with the cover.

The distal ends of the stator laminations 86 surround a passageway 94 which serves as part of the outlet port. The outlet port is in the configuration of an inverted L-shape, including a vertical section 96 and an upper horizontal section 98. A cup-shaped compartment 100 extends from the lower wall 103 of the housing surrounding the stator assembly. Likewise, an upper cup-shaped configuration 102 is provided at the top of the horizontal section 98.

A shaft 104 has rubber sockets 106, 108 at its upper and lower ends to fix the shaft in position along the vertical section 96 of the output flow path and specifically within the cups 100, 102. Placed along the shaft and rotatable thereon is a rotor 110, which is magnetically coupled to the stator as to be rotationally driven thereby. An impeller unit 112 is mechanically coupled to the rotor 110 and is driven along with the rotor 110.

Accordingly, upon energization of the coil 88, the flux passing along the distal ends of the stator laminations will serve to rotate the rotor 110, thereby driving the impeller unit 112. The impeller unit serves to draw the water up through the vertical passage 96 and continues the pumping action into the outlet conduit 26.

The filter material placed within the container can be an open cell, reticulated foam plastic material 61, such as polyurethane foam. The foam can be of very small pores to thereby provide greater surface area for the accumulation of aerobic bacteria useful in the biological filtration of the toxic material in the aquarium contaminated water. The foam material has an external periphery approximating the internal diameter of the container 16 in order to provide a snug fit. An annular central opening 114 is provided to accommodate passage of the depending tube 70 in the center of the filter.

The cover can easily be screwed off in order to gain access to the foam. Because of the very wide mouth of the filter 16, it is easy to insert and remove the foam material when replacement is necessary. The foam is simply placed on the shelf provided by the knees 54 and the cover reinserted with the tube 70 fitting into the central opening 114 in the foam material.

Figure 3:
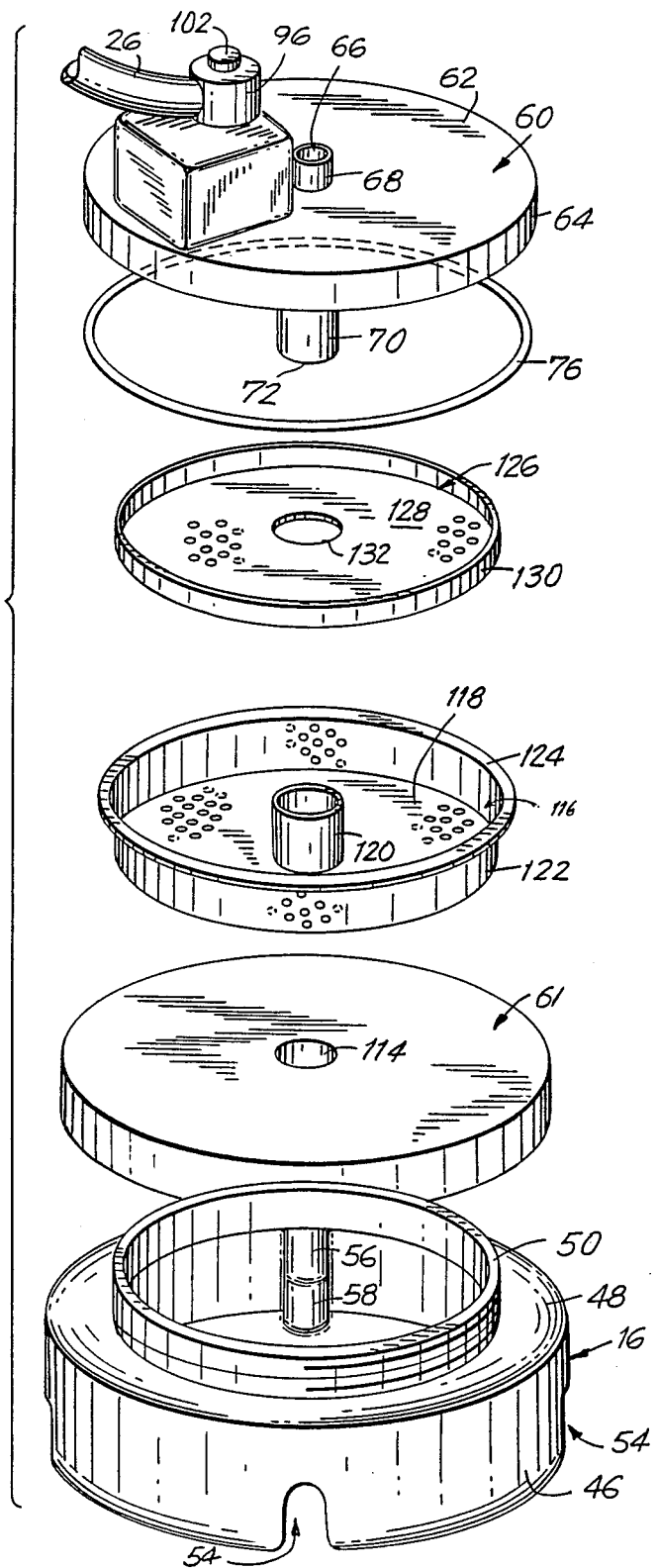
FIG. 3 is an exploded perspective view of the canister filter shown in FIG. 2.
Figure 4:
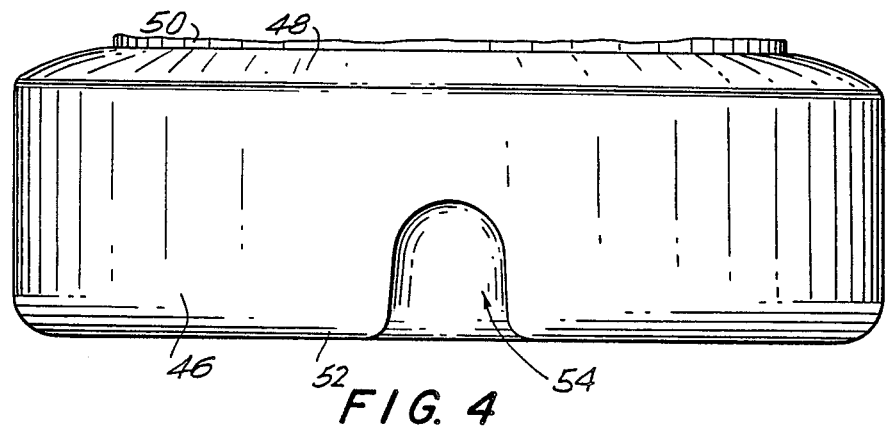
FIG. 4 is a side view of the lower portion of the filter container and showing the upwardly projecting knees providing a support shelf for the foam filtering material.
Figure 5:
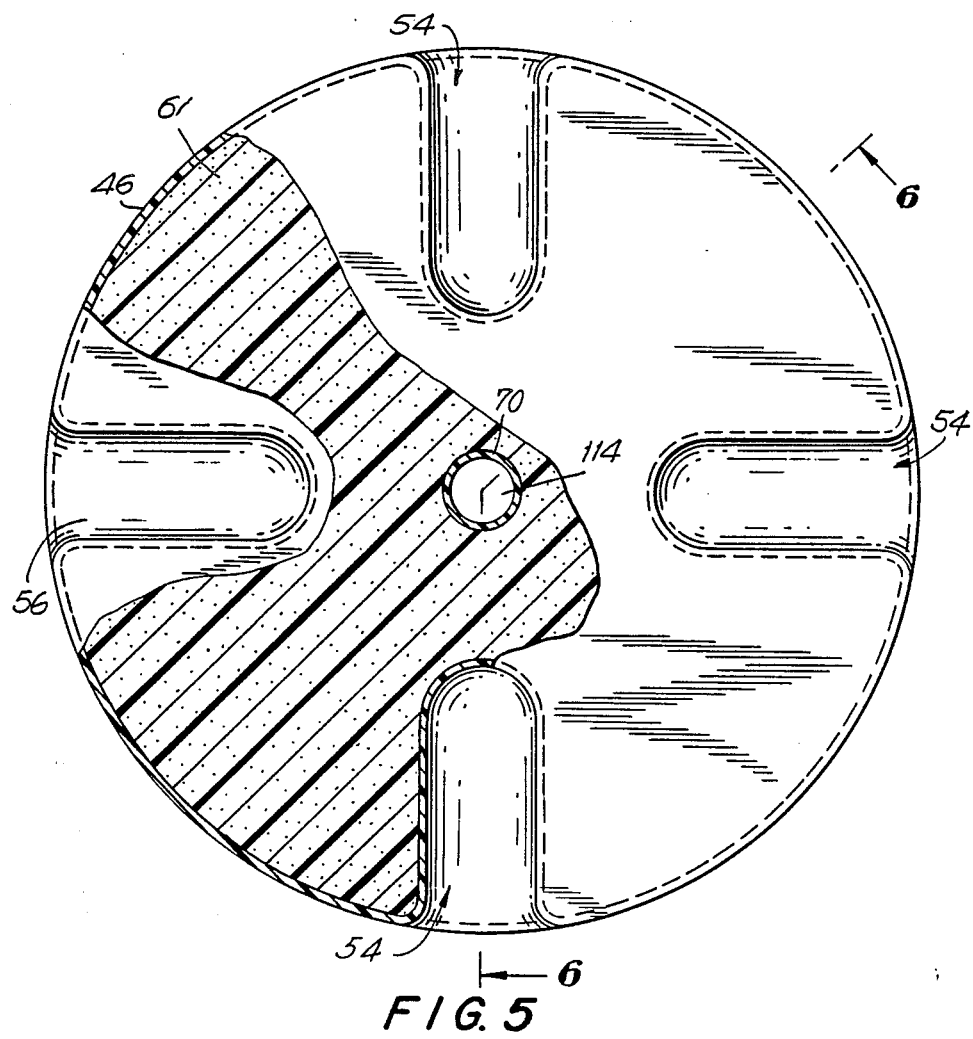
FIG. 5 is a partially broken away top view of the filter container showing the positioning of the foam filtering material within the container.

Should additional filtration material be required, there can be included a tray 116, as is best seen in FIG. 3. The tray comprises a perforated base wall 118, having a central upstanding annular stem 120 to accommodate the tube 70 passing downward therethrough. The upstanding outer peripheral wall 122 can also be perforated. The upper edge of the wall 122 terminates in an outwardly extending lip 124, which can sit on the top of the neck portion 50 of the filter housing to retain the tray in place. Within the tray there can be placed activated carbon or other filtering material. The tray can be covered with the cover 126. The cover likewise includes a perforated base wall 128 with an upstanding peripheral flange 130, which can sit into the tray 116. An annular opening 132 in the center fits over the stem 120 again permitting passage of the depending tube 70 downward therethrough.

As best shown in FIG. 6, the flow of water through the siphoning action would pass downward through the inlet tube 18 and continue through the depending tube 70 in the filter housing. The water then disperses at the bottom of the filter and moves upward through the foam filtering material 61. It will be appreciated, that the large particles of debris will accumulate at the bottom of the filter and will not serve to clog the foam material. Although the larger solid particles accumulate, the constant water flow over the sediment will help prevent the sediment from becoming foul.

The water passes upward through the foam and continues into the tray where it passes through the carbon for chemical filtration. It proceeds upward through the tray cover 126. The water then continues into the clear water chamber 134 provided at the top of the tray and within the cover portion 60. Through the aid of the impeller 112, the water is drawn upward through the vertical portion 96 of the outlet tube and then through the horizontal section 98 and passes through the outlet conduit 26 for return back into the aquarium.

Figure 8:
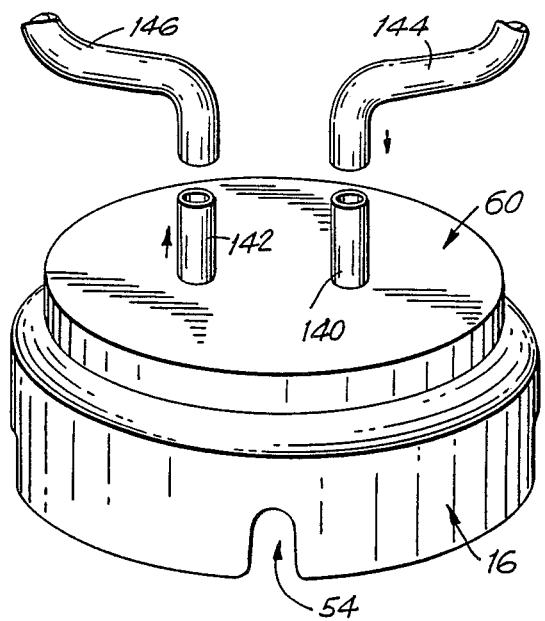
FIG. 8 is a perspective view of the aquarium filter housing of the present invention in accordance with another embodiment thereof.

As shown in FIG. 8, when utilized with an air pump or with an external water pump, the cover 60 can be provided with two ports 140, 142. One of these would serve as the inlet, and the other as the outlet. A conduit 144 would be connected to one of the ports for supply of the aquarium water, and another conduit 146 would be provided for return of the water. One of the ports 140 would include a depending tube to reach to the bottom of the filter housing 16, while the other would be in flow communication with the top of the filter housing. The proper pumping action would be provided within one of the conduits leading from the filter.

The filter housing itself can be made of plastic material and can typically be blow molded with the knee portions integrally formed therein. The cover can be formed with the housing of the stator assembly integrally molded. The size of the filter can be made even larger than the aquarium tank to increase the carrying capacity and the biological filtration surface area. When backwashing the filter, the filter bed can be maintained directly within the filter and the capacity for biological filtration can be maintained. Specifically, by using cold to tepid water, backflushing will not kill the aerobic bacteria, thereby preserving the biological activity of the filter bed.

There has been disclosed heretofore the best embodiment of the invention presently contemplated. However, it is to be understood that various changes and modifications may be made thereto without departing from the spirit of the invention.

I claim:

1. An external aquarium filter, comprising an open-top filter container, said open top being sufficiently wide to insert therein a layer of filtering material, a removable cover for said open top, an inlet fluid flow port and an outlet fluid flow port, both in said cover, said inlet flow port being substantially central of said cover, support means in said container for supporting the layer of filtering material across said filter container defining a clean water chamber above said filtering material and a contaminated water chamber below said filtering material, an inlet tube depending from said inlet fluid flow port for passing through a hole in the filtering material and in flow communication with said contaminated water chamber, and wherein the outlet fluid flow port is in flow communication with said clean water chamber, said filter container being formed as a substantially flat can of a circular cross-section and having an upwardly extending externally threaded neck portion, said cover comprising a screw-on cover top cooperating with said neck portion to close said can, said circular shape providing substantially even flow of the water from the substantially center inlet tube and upward therearound through the filtering material and into the contaminated water chamber, said support means comprising a plurality of raised knees inwardly projecting from the outer periphery of the container and along its lower part to define a shelf upon which the filtering material sits, said layer comprising a circular sheet of porous flexible foam filter material having an outer diameter approximating the inner diameter of said filter container and a central aperture for snugly receiving said depending tube, wherein said neck portion has a diameter less than the diameter of said container, and said container comprising a shoulder portion leading to said neck portion, said shoulder portion providing an upper stop for said filtering material, the thickness of said filtering material approximating the spacing between said support means and said shoulder.

2. An external aquarium filter as in claim 1, and comprising conduit means for coupling said fluid flow ports to an aquarium, and pump means for maintaining a flow of aquarium water through the filter container.

3. An external aquarium filter as in claim 2, wherein said pump means comprises an air pump, and further comprising a coupling tube for coupling the output of said air pump to the conduit connected to said outlet port to define an airlift tube for returning the aquarium water back to the aquarium.

4. An external aquarium filter as in claim 2, wherein said pump means comprises a water pump integrally mounted on said cover and operatively interposed within the outlet port flow.

5. An external aquarium filter as in claim 4, wherein said pump means comprises an encapsulated stator assembly integrally mounted on said cover, a fixed shaft mounted with respect to said outlet port, a rotor unit rotatably mounted on said shaft and magnetically coupled to said stator assembly, and an impeller unit located within the flow path within said outlet port and rotatably driven by said rotor unit.

6. An external aquarium filter as in claim 1, and further comprising a circular perforated tray for retaining additional filter material and fitting into said container, and including a central hub for receiving said inlet depending tube.

7. An external aquarium filter as in claim 6, wherein the upper edge of said tray includes an outwardly projecting retaining lip for sitting on the top edge of said neck portion.

8. An external aquarium filter as in claim 6, wherein said additional filter material includes activated carbon, and comprising a perforated tray cover on said tray for preventing said carbon from flowing into the aquarium.

9. An external aquarium filter as in claim 1, wherein said container is blow molded.

* * * * *